United States Patent [19]

Dey et al.

[11] 4,092,464
[45] May 30, 1978

[54] FLEXIBLE CELLS AND BATTERIES FORMED THEREFROM

[75] Inventors: Arabinda N. Dey, Needham; Per Bro, Andover, both of Mass.

[73] Assignee: P. R. Mallory & Co. Inc., Indianapolis, Ind.

[21] Appl. No.: 706,877

[22] Filed: Jul. 19, 1976

[51] Int. Cl.² .................... H01M 4/02; H01M 6/16
[52] U.S. Cl. .................. 429/127; 429/131; 429/160; 429/211; 429/219; 429/194
[58] Field of Search ............. 429/127, 131, 136, 139, 429/153, 159, 185, 211, 217, 219, 232, 242, 245, 209, 194

[56] References Cited
U.S. PATENT DOCUMENTS

| 2,003,494 | 6/1935 | Reynolds | 154/2 |
|---|---|---|---|
| 2,851,509 | 9/1958 | Pasquale et al. | 429/131 |
| 2,880,259 | 3/1959 | Nowotny | 429/154 |
| 3,013,100 | 12/1961 | Mendelsohn et al. | 429/130 |
| 3,023,259 | 2/1962 | Coler et al. | 429/127 |
| 3,192,071 | 6/1965 | Vinal | 429/213 |
| 3,239,380 | 3/1966 | Berchielli | 429/127 |
| 3,375,136 | 3/1968 | Biggar | 429/223 X |
| 3,658,592 | 4/1972 | Dey | 429/197 |
| 3,674,562 | 7/1972 | Schneider et al. | 429/213 X |
| 3,708,340 | 1/1973 | Tamminen | 429/185 X |

*Primary Examiner*—Anthony Skapars
*Attorney, Agent, or Firm*—Ronald S. Cornell; Israel Nissenbaum; Charles W. Hoffmann

[57] ABSTRACT

A high energy density cell or battery capable of undergoing flexural stress with little effect on its discharge properties either during and after subjection to stress.

19 Claims, 7 Drawing Figures

FLEXIBLE CELLS AND BATTERIES FORMED THEREFROM

This invention relates to high energy density cells or batteries which are subjected to and can withstand repeated stress conditions and abuse in the form of repeated flexing and more particularly to such cells or batteries formed therefrom wherein there is employed an active cathodic element including a fibrous, conductive material, the cathodic element being sealed in a plastic envelope.

High energy organic electrolyte cells such as those utilizing active components such as lithium anodes and volatile organic electrolytes such as tetrahydrofuran must be isolated from ambient atmospheric conditions. Heretofore, such isolation has usually been accomplished by the use of hermetically sealed containers of some bulk and rigidity for protection against abuse and possible rupture. However, truly hermetically sealed packages which have a degree of flexibility have been generally confined to thin film or solid state cells with a minimum of corrosive electrolyte. Generally those cells which are referred to as being flexible and which do not contain rigid electrode elements contain, for the most part, less corrosive alkaline cell components. These cells are constructed to be adaptable to fit into odd shaped spaces or to be wrapped around electrical componentry. However, they cannot withstand repeated abuse or flexing without deterioration of the electrochemical and structural properties of the cells. This deterioration includes electrolyte leakage and contamination of cell elements resulting from rupture or opening of the cell package, separation of electrode materials from current collectors and electrical tab contacts, fatigue of metal electrodes if used without supporting current collectors and generally the crumbling and disintegration of electrodes, especially of the pressed powder type, resulting in reduced cell capacity and internal shorting.

It is therefore an object of the present invention to provide high energy density cells which can undergo flexing stresses while maintaining electrical and structural integrity for substantially the entire electrical life of the cell battery.

It is another object to provide a cell, in which each of the individual component elements, as well as the cell as a whole, has the ability to withstand repetitive flexural stress abuse both structurally and electrically.

Generally, the present invention involves both the composition and the form of an electrochemical cell. In the case of cells having highly active or volatile components the cell container must have the features of substantial hermeticity even under flexural strain and abuse and the container material must also be impermeable to the volatile solvent vapors. A container having such qualities is one composed of a heat sealable foil laminate in which the layer facing the interior of the cell is a heat sealable non-conductive plastic which is inert to the volatile organic solvent but permeable to the solvent vapors, and a metal foil outer layer placed upon the inner layer. The metal foil is impermeable to the solvent vapors. Direct contact is undesirable because of the electrically conductive nature of metals which might lead to shorting of the cell. The metal foil is supported by the inner plastic layer. For additional protection a third layer, of plastic, is desirably placed upon the outside of the foil layer thereby totally enclosing and protecting the metal layer from abuse. The third layer is also useful for providing electrical insulation between two or more connected cells as well as for providing additional heat sealing characteristics in individual cells and cells in heat sealed combinations.

A limiting factor on the flexibility of cells is the degree of flexibility of the electrodes. Metal electrodes have a degree of flexibility, especially when the metal electrode is used in the form of thin sheets. However in the case of metals such as lithium, repeated flexing of the electrode tends to work harden the metal and thereby cause it to become brittle. Thus, though lithium sheets can normally be used with or without a backing it is highly desirable to provide a flexible, metallic mesh, current collector backing for the active material so that the structure will be able to withstand repeated flexural stresses.

As a further refinement which results in increased flexibility the electrode active material can be segmented. This permits most of the flexural stress to be concentrated at the points of the current collector between the active segments. Since the current collector does not become embrittled to the same extent as would lithium, increased resistance to the normally deleterious effects of flexural stress can be obtained. Additionally, with segmentation of the active material on the current collector, dislodgement of the active material from the current collector is minimized.

Heretofore, electrodes have been found on an expanded metal current collector from cathode active powder (e.g. $Ag_2CrO_4$), binders such as polytetrahaloethylene, and a conductive powdered material. Such electrodes, however, have a high degree of rigidity whereby flexing of a cell containing such a cathode results in crumbling or cracking of the electrode structure with the high probability of internal shorting and loss of capacity. In accordance with the present invention it has been discovered that, in addition to or even in place of some or all of the graphite powder, (included in the electrode structure for conductivity) chopped graphite fibers can be homogeneously dispersed in the electrode to eliminate the rigidity of the electrode whereby to attain a high degree of resiliency as well as structural integrity when subjected to flexural stress. The amount of graphite fibers necessary can be as low as about 0.1%, which minimal amount will not significantly affect the capacity of the cathode.

The present invention also contemplates the use of a pouch in which the cathodic material is enclosed. The pouch will advantageously be formed from a flexible material (e.g. polyolefins such as polypropylene) which is sufficiently porous to permit electrolyte ion flow while inhibiting the movement of the solid electrode materials therethrough. The flexible material must be compatible with all of the cell components such as the lithium, silver chromate and electrolytes such as lithium perchlorate in tetrahydrofuran and propylene carbonate which are used in one embodiment of the high energy density, flexible, cells of the invention. Additionally, the flexible separator which surrounds the pressed powder electrode for structural integrity during flexation will advantageously be closed on all sides to prevent any loose particles of the pressed powder electrode which may form from shorting the cell. This is accomplished by heat sealing the pouch after insertion of the cathodic element, leaving only the terminal tab extending therethrough.

The expanded metal current collectors used as a backing for the active cathode material should have the requisite flexibility and should be compatible with the electrode and electrolyte materials. Such materials include expanded titanium, tantalum, molybdenum, zirconium, niobium, vanadium, chromium, tungsten, and stainless steel. The tab materials for external electrical connection can be made of the same materials as the current collectors with tantalum being the preferred material for such tabs.

It is highly desirable for the flexible cell, if it is to operate satisfactorily, that the electrochemical system be neither pressurized nor gassing in nature since internal pressure (above a minimal amount) could result in puffing of the cell container which could result in deterioration of the hermetic seal.

Active component for flexible cells include, as preferred anode material, those metals above hydrogen in the EMF scale such as the above-mentioned lithium and the other metals in Groups IA & IIA of the Periodic Table. In some circumstances, if the cell so formed is not subject to any significant amount of gassing, zinc, cadmium, aluminum and like anodes can also be used.

Active cathode materials include materials such as metal chromates and dichromates, permanganates, vanadates, oxides and the like which can be made into pressed powder structures.

Other objects, advantages, and features of the invention will be discerned from a further description of the invention as well as from the drawings in which.

Figures 1, 2:
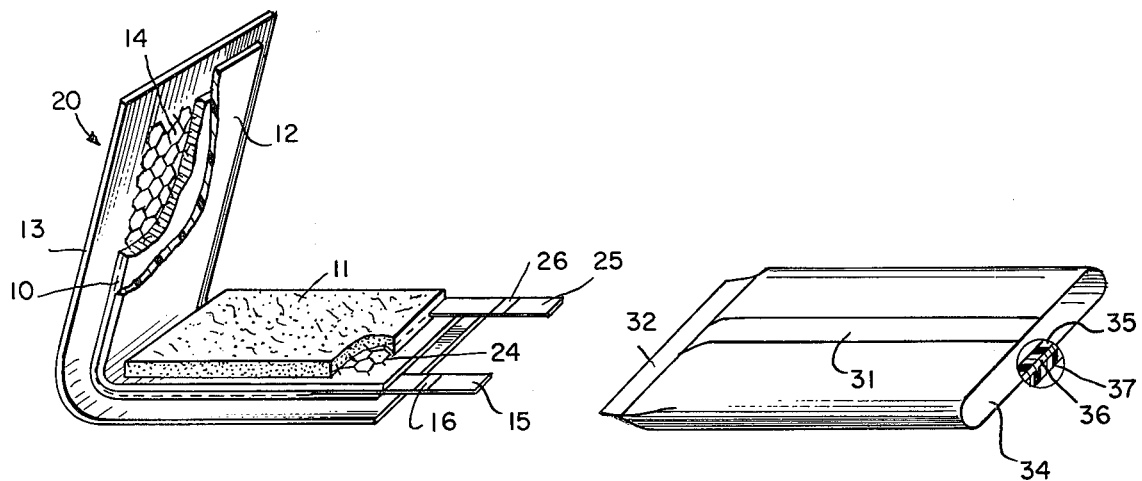
FIG. 1 is an isometric view of the internal cell components prior to sealing, with sections cut away for clarity.
FIG. 2 is an isometric view of the outer cell casing.

Referring now to the drawings, FIG. 1 shows the cell components wherein an anode 10 is folded about a cathode 11. A porous separator 12 separates the anode 10 and the cathode 11 and extends beyond the perimeter of the cathode material. The separator 12 may be any suitable microporous thermoplastic material which is capable of being heat sealed to enclose the cathode 11. Suitable materials include polyolefin films such as those described in U.S. Pat. No. 3,351,495, the disclosure of which is incorporated herein by reference. Surrounding the anode 10 is a sheet 13 composed of the same type of sealable material as the separator. The sheet 13 extends beyond the perimeter of the anode and is heat sealed to enclose both the anode 10 and the cathode 11. The latter enclosure 13 serves to hold the anode and cathode together during flexural stress. The anode 10 can be made by pressing an active metal sheet onto an expanded metal current collector 14. The active metal can be segmented at intervals in order to increase the pliability and ruggedness of the anode. The size of the active metal segments can be varied, with increasing segment sizes (i.e. less spaces) resulting in greater capacity at the cost of pliability; while decreasing the size of the segments or enlarging the space between segments results in more unused space which will reduce capacity but increase pliability. The anode terminal is made via a metal tab 15 which is spot welded to the expanded metal current collector 14.

The cathode 11 is fabricated by blending powdered active material with a binder, graphite fibers, and, depending on the conductivity of the active cathode material and the intended use of the cell, a powdered conductive material.

The conductive material can be added in amounts of about 1 to 50 percent; preferably, as when the active cathodic material is silver chromate, the amount of conductive powder will be up to 10 percent. The conductive fibers will be present in an amount of at least 0.1 percent by weight. Preferably, the fibers are graphite and are present in an amount of between about 0.1 and 10 percent. Most preferably, about 0.5 percent fibers are present. The binder is used in amounts of about 2 to 30 percent; preferably about 10 percent binder is used. At least 50 percent, preferably 70 percent, active material should be used.

Polytetrafluoroethylene is a preferred binder, but other binders, such as polytrifluoroethylene, polytrifluorochloroethylene, polyethylene, and polypropylene can also be used. The balance of the compositions will generally be the preferred active cathode material. The graphite fibers will advantageously be homogeneously dispersed throughout the cathode structure where they provide the flexibility and structural integrity necessary for the cathode to operate satisfactorily under flexural stress. The admixture of materials forming the cathode is mixed with any suitable liquid in a manner known in the art (see, for example, U.S. Pat. No. 3,655,585; also copending application Ser. No. 671,879, filed Mar. 29, 1976 and having the same assignee as the instant application) and blended until it has a consistency of dough. It is then rolled onto expanded current collector 24 and dried under vacuum. External electrical connection to the cathode is made by spot welding metal tab 25 to the cathode current collector 24. The anode and cathode tabs 15 and 25 are coated with a heat sealable material (16 and 26 respectively) to permit the formation of a durable seal with the outer cell casing 30.

After the anode 10 and cathode 11 have been heat sealed in their respective casings 13 and 12, the entire assembly 20 is placed in foil laminate bag 30, shown in FIG. 2. The foil laminate bag 30 is formed by folding a planar sheet of a composite plastic-metal material, such as one having an aluminum foil layer 36 sandwiched between two polyethylene layers 35 and 37, and heat sealing the ends of the folded sheet as shown. The heat seals which form bag or pouch 30 are shown in FIG. 2 as 31 and 32. The planar sheet of plastic-metal foil laminate material is folded over onto itself as shown and heat sealed; first down the center 31 where the edges of the sheet overlap, and then at one end 32, thereby forming an open edged bag 30. The cell assembly 20 of FIG. 1 is inserted through the open end 34 of the bag 30, and the cell is filled with electrolyte. Thereafter, the bag 30 is sealed, by heat seal 38 (FIG. 3) along the open end 34 to hermetically enclose the cell contents. For hermeticity, the tabs 15, 25 leading from the anode and cathode are coated with a heat sealable material at the point at which they are contacted by the final heat seal. Tabs 15 and 25 protrude from the cell casing for electrical connection. Cells in accordance with the invention will have a maximum thickness of about 100 mils, preferably about 15 to about 70 mils.

Figure 4:
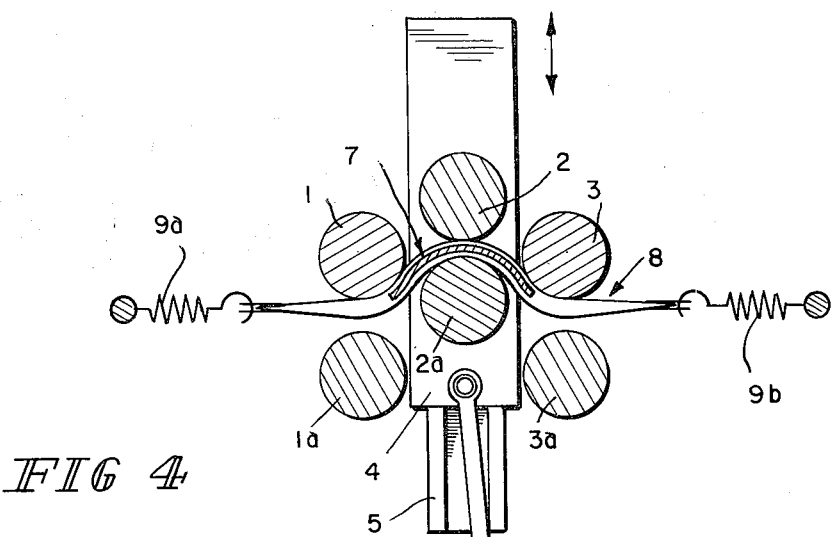
FIG. 4 is a schematic view of one type of apparatus which can be used for testing the flexibility of the cells.

FIG. 4 depicts a testing device which is useful to determine the effect of repetitive flexing upon a cell.

The device comprises three pairs of 1 inch diameter cylindrical rods 1, 1a, 2, 2a, and 3, 3a of which the two outer pairs 1, 1a and 3, 3a are stationary and the middle pair 2, 2a is mounted on plate 4 which is slidably mounted in guide 5 and driven by camshaft arrangement 6 so that the pair of rods 2, 2a move back and forth. A cell 7 is placed in the cell holder 8 which comprises two layers of flexible polyester sheets held tightly in place by means of two springs 9a and 9b. The arrows indicate operational motion. One flexural cycle is defined as including one flex of a cell in each direction.

Figure 5:
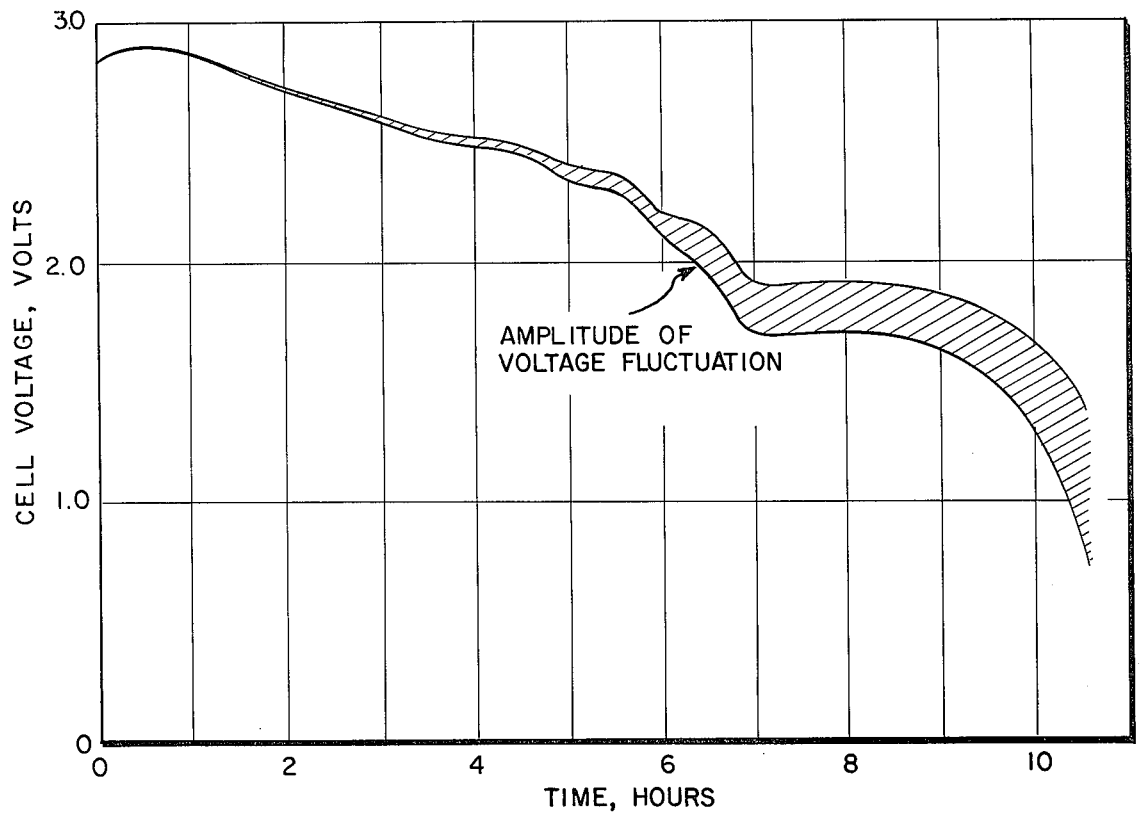
FIG. 5 is a discharge curve showing the voltage of a cell of the invention which is being discharged while it is being flexed.

FIG. 5 is a discharge curve showing the discharge voltage of one cell (that of Example 1 below), the voltage being measured as the cell was being subjected to repetitive flexing cycles on the apparatus of FIG. 4, said cell being subjected to flexing at the rate of 100 cycles per minute.

Another testing device which is useful for determining the properties of cells formed in accordance with the present invention is one (not shown) which accurately measures the pliability. Such device includes a 1 inch diameter horizontally disposed, stationary rod. A cell is placed on the rod and covered with a thin polypropylene foil which is connected by means of strings to a pan which hangs below the horizontal rod. A stationary metal plate is located ½ inch below a metal pointer attached on the bottom of the pan. The pliability of the cell is determined by adding tiny pellets to the pan until the pointer touches the stationary metal plate. A light bulb and a battery are operatively connected to the pointer and to the metal plate to indicate when the electrical circuit is completed. The weight of the metal pellets in the pan is taken as a measure of the inverse pliability of the cells. That is, the lower the weight required to bend the cell, the greater is the pliability. Meaningful comparisons between the pliability of two different structures can be obtained, but only when they have the same width and length.

Figure 6:
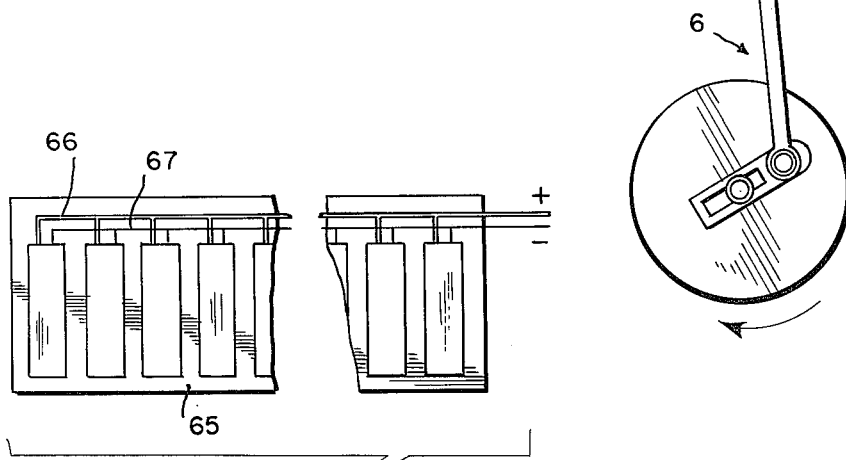
FIGS. 6 and 7 show alternative, useful embodiments of multicell batteries.
Figure 7:
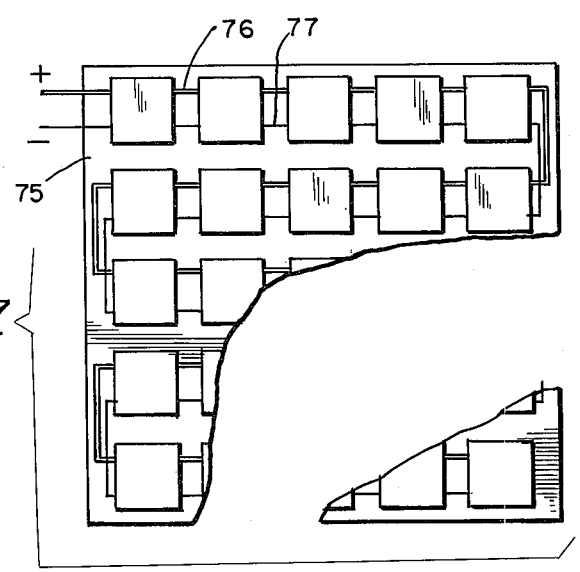

Examples of multicell, flexible batteries are schematically shown in FIGS. 6 and 7. FIG. 6 shows a band type battery 65 having a constant width and a variable length as additional cells such as those described are added to lengthen the structure. The cells in this embodiment are shown to be connected in parallel for greater current capacity.

FIG. 7 shows a planar arrangement of cells formed into a square battery 75 and the electrical connections therebetween.

In both FIGS. 6 and 7 the cells are preferrably electrically interconnected by long insulatively coated tabs 66, 67 and 76, 77 respectively, for simple parallel connections. The cells so arranged are sealed within flexible casing 65, 75 similar to the construction of the unit cell casings of FIG. 2.

The multicell construction has the advantage of lower resistance to bending and an increased capability of withstanding flexural cycles. A disadvantage as compared with the unitary flexible cells is a possible reduction of energy density resulting from unused spacing between the cells. Other arrangements of the cells in multicell batteries as well as the variations in the individual sizes of the unit cells and other modifications of the same ilk are contemplated to be within the ambit of the present invention.

The following Examples are given to further illustrate the invention. In the examples, as throughout the specification; all parts or percentages given are by weight unless otherwise specified.

EXAMPLE I

Figure 3:
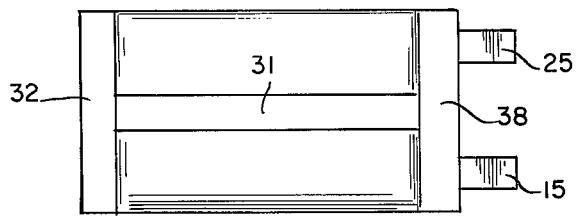
FIG. 3 is a top view of a completed cell.

A flexible cell is made in accordance with the principles of the present invention and as shown in FIGS. 1-3. The cell is made using a lithium anode 10 folded about a silver chromate ($Ag_2CrO_4$) cathode 11. "Celgard", a porous polypropylene separator 12 (0.001 inch thick) separates the anode and the cathode and extends beyond the perimeter of the cathode material. The polypropylene of separator 12 is a thermoplastic, microporous material which is heat sealed to enclose the cathode 11 with only tab 25 extending therethrough. Surrounding the lithium anode 10 is a second sheet 13 of polypropylene. Sheet 13 extends beyond the perimeter of the lithium anode and is heat sealed to enclose both the lithium anode 10 and the pouch containing the silver chromate cathode 11 leaving tabs 15 and 25 extending therethrough. The lithium anode 10 is segmented, and is made by pressing lithium strips having a thickness of 0.01 inch and a width of 0.25 inch onto expanded titanium current collector 14, the lithium strips being spaced at about 1/16 inch intervals. The anode terminal is made via a tantalum tab 15 which is spot welded to the expanded current collector 14.

The cathode 11 is fabricated from 85 percent powdered $Ag_2CrO_4$ with 4.5 percent powdered graphite, 10 percent colloidal polytetrafluoroethylene binder and 0.5 percent graphite fibers. The formation of the cathode includes the steps of treating fibrous graphite (¼ inch Basic Carbon Corp.-GY2-30) in a Waring blender for 15 seconds at medium speed; mixing silver chromate with the graphite powder and fibers; thoroughly milling the mixture; pelletizing the ground mixture; grinding the pellets; passing the resulting powder-fiber mixture through a 100 mesh U.S. sieve; adding the polytetrafluoroethylene binder with sufficient isopropyl alcohol to form a slurry thereof; mixing the resulting admixture till it becomes rubbery; rolling the mixture into sheets; and pressing a sheet onto each side of an expanded titanium current collector which is thoroughly dried under vacuum. The cathode structure has dimensions of about 2 inches × 0.6 inch × 0.012 inch. The graphite fibers are homogeneously dispersed throughout the cathode structure where they provide the flexibility and structural integrity necessary for the cathode to operate satisfactorily under flexural stress. External electrical connection to the cathode is made by spot welding a tantalum tab to the titanium cathode current collector. The anode and cathode tabs are coated with a heat sealable material (polyethylene strips 16 and 26 respectively) to permit the formation of a durable seal with the outer cell casing 30.

A foil laminate bag is formed by folding a planar sheet 33 of material having an aluminum foil layer 36 sandwiched between two polyethylene layers 35 and 37 (a single sheet of said material having a total thickness of 0.003 inches) and heat sealing the ends of the folded sheet. The heat seals forming bag or pouch 30 are shown in FIG. 2 as 31 and 32. The planar sheet of plastic-foil laminate material is folded over onto itself as shown and heat sealed down the center 31 where the edges of the sheet overlap at one end thereby forming an open ended bag 30. The cell assembly is inserted through the open end 34 of the bag 30, and the cell is filled with electrolyte in the form of 1M lithium perchlorate dissolved in a mixture of equal parts of propylene carbonate and tetrahydrofuran and the excess squeezed out. After the cell is filled with the electrolyte the bag is heat sealed along the open end to hermetically enclose the cell contents. For hermeticity, the tabs 15, 25 leading from the anode and cathode are coated with polyethylene at the point at which they are contacted by the final heat seal. Tabs 15 and 25 protrude from the cell casing for electrical connection. The above cell has a total thickness of about 0.055 inch and measures 0.75 and 4000 flexural cycles at 100 CPM, when the cells were discharged while being flexed, the cells were able to withstand even larger number of flexural cycles before failure. Cell 15 (Table 2) is described in Example I and, as noted, lasted 63,859 cycles prior to failure. It was flexed at 100 CPM while being discharged at 5 mA.

TABLE 1

FLEXURAL CHARACTERISTICS OF THIN FOIL TYPE CELLS

| Cell No. | Cathode Thickness (mils) | Cell Thickness (mils) | Cathode Weight (gm) | Flexing Conditions | 2.0V Cut-Off hours percent efficiency→ | | 1.0V Cut-Off hours percent efficiency→ | |
|---|---|---|---|---|---|---|---|---|
| 1 | 5.5–6.5 | 26 | 0.2777 | fresh, no flexing | 6.7 | 43.94 | 9.5 | 62.3 |
| 2 | 5.5–6 | 25 | 0.2623 | " | 3.6 | 24.99 | 4.3 | 29.86 |
| 3 | 4.5–6 | 24.5 | 0.2704 | 100 cycles at 10 cpm | 8.5 | 57.25 | 11.75 | 79.14 |
| 4 | 6–6.5 | 26.5 | 0.3177 | " | 7.66 | 43.9 | 14.3 | 82 |
| 5 | 6–7 | 25.5 | 0.3078 | 1000 cycles at 10 cpm | 9.5 | 56.21 | 13.75 | 81.35 |
| 6 | 7 | 25.5 | 0.3303 | " | 8.0 | 44.11 | 10.5 | 57.89 |
| 7 | 6.5 | 25.0 | 0.3201 | 100 cycles at 100 cpm | 8.3 | 47.22 | 13.0 | 73.96 |
| 8 | 6.5 | 26.0 | 0.2821 | " | 8.25 | 53.25 | 10.9 | 70.36 |
| 9 | 7–8 | 27.0 | 0.4006 | 1000 cycles at 100 cpm | 12.75 | 57.96 | 17.63 | 80.15 |
| 10 | 7–8 | 27.0 | 0.3672 | " | 8.25 | 40.91 | 13.0 | 64.47 |

Cathodes: 85 percent $Ag_2CrO_4$ with 10 percent Teflon binder, 4.5 percent graphite powder, and .5 percent graphite fibers. Anodes: Lithium of 2 mils thickness supported on a Ti screen; cells 1–6 segmented in ¼ inch strips; cells 7–10 non-segmented.
"Celgard" separators enclosed cathodes formed in accordance with Example 1. Cell casing is a 3 mils foil laminate material having an aluminum foil layer between two polyethylene layers. All cells are discharged at 5 mA.

TABLE 2

Performance of Flat Foil Type Cells With Segmented Li Anode With Ta Tab

| Cell No. | Cell Thickness (mils) | Total Number of Flexural Cycles | Flexing Frequency (cycles/minute) | Hours of Operation at 5 mA to 1.0 volt | Remarks |
|---|---|---|---|---|---|
| 11 | 51 | 1000 | 100 | 24 | — |
| 12 | 51 | 2000 | 100 | 14 | — |
| 13 | 53 | 4000 | 100 | 14.5 | — |
| 14 | 53 | 36000 | 50 | 12 | Flexed during discharge |
| 15 | 55 | 63859 | 100 | 10.6 | Flexed during discharge | inch by 2.0 inches (not including the tab length) and is subjected to flexural stress on the testing device depicted in FIG. 4 and described above. The cell was electrically discharged while being flexed, and FIG. 5 is a discharge curve showing the cell voltage as a function of time. The cell is discharged at 5 mA while being flexed at 100 cycles per minute and it lasted 63,859 cycles before failure. Failure is defined in the instant case as an amplitude of voltage fluctuation caused by the flexing conditions so large that meaningful cell operation becomes impossible. The cell accordingly lasted for about 10 hours to 1.0 volt.

EXAMPLE II

Flexural Characteristics

The flexural characteristics of flexible cells (0.75 inch × 2.0 inches) made in accordance with the procedure herein are evaluated by first flexing the cells for a large number of flexural cycles at frequencies of 10, 50 and 100 cycles/minute. The cells are then discharged at a constant current of 5 mA and the cells are tested electrochemically for efficiency by discharging them and determining the cell capacity to a cut-off voltage of 2.0 and 1.0 volt. The results are shown in Tables 1 and 2. Two cells (14 and 15) were discharged while they were being flexed at frequencies of 50 and 100 cycles/minute. The cells are cathode limiting and therefore the performance of the cells is also expressed in terms of the utilization efficiency of the cathode in Table 1. There is no degradation of cell performance after 1000 flexural cycles at cycling frequencies of 10 to 100 CPM (cycles/minute). The data in Table 2 indicates that though there is some degradation of cell performance after 2000

EXAMPLE III

Pliability Characteristics

The pliability of cells with dimensions of 0.75 inch by 2.0 inch was measured for four types of cell constructions. The results are shown in Table 3. Inverse pliability (stiffness) is defined as the weight required to bend the flexible cell around a 1 inch diameter rod and is quite reproducible for a particular type of cell construction.

The average inverse pliability values for cells with 0.01 inch thick non-segmented and the segmented lithium foil are 335 grams and 132 grams respectively. Thus segmentation resulted in an almost threefold improvement in pliability. The average values for the inverse pliability of cells with 0.002 inch thick lithium foil are 106 gm for the non-segmented type and 85 gm for the segmented type. Reduction of thickness of the lithium foil results in a significant improvement in pliability. Increased pliability, with its resultant reduced cell component deterioration under stress, is thus attained by segmentation of electrodes and, in this case, specifically the lithium anode. However, reduced capacity results from both segmentation and reduced thickness. A weighing of priorities (pliability v. capacity) in light of the cells intended use is therefore called for in order to obtain an optimum balance.

TABLE 3
MEASUREMENTS OF PLIABILITY OF THE FLAT FOIL TYPE CELLS

| Cell No. | Cell Thickness (In.) | Anode Construction* Foil Thickness (inch) | Segmented | Inverse Pliability** |
|---|---|---|---|---|
| 16 | 0.069 | 0.01 | No | 320 |
| 17 | 0.068 | 0.01 | No | 311 |
| 18 | 0.067 | 0.01 | No | 373.8 |
|  |  |  |  | Average of cells 16 to 18 = 335 |
| 19 | 0.051 | 0.01 | Yes | 129.1 |
| 20 | 0.050 | 0.01 | Yes | 135.5 |
|  |  |  |  | Average of cells 19 and 20 = 132 |
| 21 | 0.0260 | 0.002 | Yes | 85 |
| 22 | 0.0250 | 0.002 | Yes | 77 |
| 23 | 0.0245 | 0.002 | Yes | 85.5 |
| 24 | 0.0265 | 0.002 | Yes | 80.2 |
| 25 | 0.0255 | 0.002 | Yes | 86.5 |
| 26 | 0.0255 | 0.002 | Yes | 80 |
| 27 | 0.0250 | 0.002 | Yes | 91.5 |
| 28 | 0.0260 | 0.002 | Yes | 90.9 |
|  |  |  |  | Average of cells 21 to 28 = 85 |
| 29 | 0.0270 | 0.002 | No | 109.2 |
| 30 | 0.0270 | 0.002 | No | 93.2 |
| 31 | 0.0270 | 0.002 | No | 101.5 |
| 32 | 0.0285 | 0.002 | No | 118.4 |
|  |  |  |  | Average of cells 29 to 32 = 106 |

*Lithium foil on expanded titanium current collector.
**Weight in grams required to bend the cell around 1 inch diameter rod.

In the construction of the electrodes for the above described flexible cells the thickness of the electrodes becomes a limiting factor with respect to flexibility. Thus, in the construction of the pressed powder electrodes the maximum thickness which would still retain flexible characteristics is about 40 mils. The thickness of the anode metal is likewise limited and the thickness can range from about 2 to 20 mils with a preferred thickness range of 10 to 20 mils.

The cell as a whole should not have a total thickness in excess of about 100 mils with a preferred thickness range between 20 and 70 mils.

The cells contemplated within the present invention are those generally utilizing high energy density organic electrolytes comprising an electrolyte salt dissolved in an organic solvent.

Examples of useful electrolyte salts include perchlorates, tetrachloroaluminates, tetrafluoroborates, halides, hexafluorophosphates and hexafluoroarsenates of metals from Groups IA and IIA of the Periodic Table.

Examples of useful, organic solvents include: esters and orthoesters such as propylene carbonate, dimethyl carbonate, alkyl formates such as methyl and butyl formate, alkyl acetates, butyrates, methyl or ethyl orthoacetate and orthoformate; ethers such as tetrahydrofuran, methoxyethanes and methoxy methanes, ethers derived from ethylene glycol and polyethylene glycol, and cyclic ethers such as dioxane, dioxolane; aldehydes and ketones such as acetaldehyde and acetone; nitriles such as acetonitrile, propionitrile, benzonitrile; and amides such as formamide, N,N dimethyl formamide, N,N dimethylacetamide and closely related amide like compounds such as N,N dimethyl methyl carbamate and tetramethylurea; amines such as N-nitrosodimethylamine as well as other known solvents such as dimethyl sulfite, dimethyl sulfoxide, and gamma-butyrolactone.

While there are shown and described presently contemplated embodiments of the invention, it is to be understood that the invention is not limited thereto, but may be otherwise variously embodied and practiced within the scope of the following claims.

What is claimed is:

1. A cathodic structure for a flexible electrochemical cell comprising a compressed mixture of a powdered cathode active material, chopped graphite fibers, and a binder; said mixture being affixed to a flexible metallic current collector; a metal tab affixed to said collector; and said compressed mixture and said current collector being sealed within a plastic pouch with said metallic tab extending therethrough; the plastic of said plastic pouch having sufficient porosity to permit ionic flow therethrough, and the pores thereof being sufficiently small that solid particles will not pass therethrough.

2. The cathodic structure of claim 1 wherein said compressed mixture further includes graphite powder.

3. The cathodic structure of claim 1 wherein said structure has a total thickness less than 40 mils.

4. The cathodic structure of claim 1 wherein said mixture contains at least 50 percent cathode active material by weight.

5. The cathodic structure of claim 1 wherein said mixture contains at least 0.1% graphite fibers by weight.

6. The cathodic structure of claim 1 wherein said cathode active material is silver chromate ($Ag_2CrO_4$).

7. The cathodic structure of claim 1 wherein said plastic is a heat sealable, flexible, microporous polymeric material.

8. The cathodic structure of claim 1 wherein said metallic current collector is an expanded metal with the metals of said current collector and said tab being individually selected from the group consisting of stainless steel, tantalum, titanium, molybdenum, zirconium, niobium, vanadium, chromium, and tungsten.

9. A flexible, non-gassing, high energy density electrochemical cell comprising a flexible, active metal anode having an electrically conductive tab operatively associated therewith; an organic electrolyte; a cathodic structure as defined in claim 1; and an outer, flexible, electrolyte impermeable container hermetically sealed around said anode, said electrolyte and said cathodic structure, with said tabs extending through said outer container.

10. A cell as in claim 9 wherein said anode substantially surrounds said cathodic structure, and a plastic pouch is positioned inside said outer container and sealed around both said anode and said cathodic structure.

11. A cell as in claim 9 wherein said anode is affixed to a flexible, expanded metal, current collector and said tab associated with said anode is affixed to said current collector.

12. A cell as in claim 11 wherein said anode comprises segmented portions of said active metal in close proximity to one another and arranged in a parallel direction on said current collector.

13. A cell as in claim 9 wherein said anode has a thickness less than about 20 mils.

14. A cell as in claim 9 wherein said active metal is lithium.

15. A cell as in claim 14 wherein said cathode active material is silver chromate.

16. A cell as in claim 9 wherein said cell has a thickness less than about 100 mils.

17. A cell as in claim 15 wherein said electrolyte comprises an electrolyte salt dissolved in an organic solvent.

18. A cell as in claim 9 wherein said outer container is a three layer, flexible composite of a metal foil sandwiched between two layers of a non-electrically conductive, heat sealable polymeric material.

19. A multicell battery comprising two contiguous sheets of polymeric material having a plurality of the cells defined in claim 9 positioned therebetween in spaced relationship to each other, said sheets of polymeric material being sealed to each other around said cells, and said cells being operatively, electrically connected to each other.

* * * * *